June 6, 1950         J. A. MONTGOMERY         2,510,477

TUBE COUPLER

Filed March 23, 1948

INVENTOR.
James A. Montgomery
BY
Attorney

Patented June 6, 1950

2,510,477

UNITED STATES PATENT OFFICE 2,510,477

TUBE COUPLER

James A. Montgomery, Eugene, Oreg., assignor to Irrigation Equipment Co., Eugene, Oreg., a copartnership Application March 23, 1948, Serial No. 16,479

5 Claims. (Cl. 285—163)

My present invention relates to a coupler or tube coupling for connecting separable sections of pipes, tubes or other conduits for conveying water, air, or other liquids or gases. The principal object of the present invention is to provide a quick coupling means whereby sections of irrigation conduits may be attached together or detached and shifted about rapidly, such means comprising a gasket which expands to form leakproof joints.

A further object of the present invention is to provide a coupler having gasket means therein, the two being so constructed and arranged that the minimum resistance to fluid flow is presented.

A further object of the present invention is to provide a gasket for a coupler and associated tube, the gasket being mounted upon one of the members, such as the tube, and presenting a large surface area which is firmly forced against an adjacent surface of the other member, such as the coupler, when fluid is forced through the conduit, which gasket is so formed that the sealing surface is retracted when pressure is released so that insertion of the tube into the coupler or withdrawal therefrom may be readily accomplished with the minimum amount of friction. Couplers as heretofore formed in which a large sealing area is presented have the defect that the sealing area is always projected into frictional engagement with the surface of the member into which the gasket is inserted, with the result that it is almost impossible properly to seal the gasket and the surface of the sealing area is quickly abraded or torn so that its effectiveness is impaired or destroyed. The object of the present invention is to provide such a gasket which not only affords rapid placement or displacement but which is not scratched or torn during relative movement of the coupling parts.

A further object of the present invention is to provide a coupler having a sealing gasket of most efficient design wherein no force tending to permit escape of fluid can equal or surpass the forces tending to seal the joint against the escape of fluid.

The objects and advantages of the present invention will be more readily understood by reference to the accompanying drawings taken in connection with the following specification wherein like numerals refer to like parts throughout, while the features of novelty will be more distinctly pointed out in the appended claims.

Figure 1:
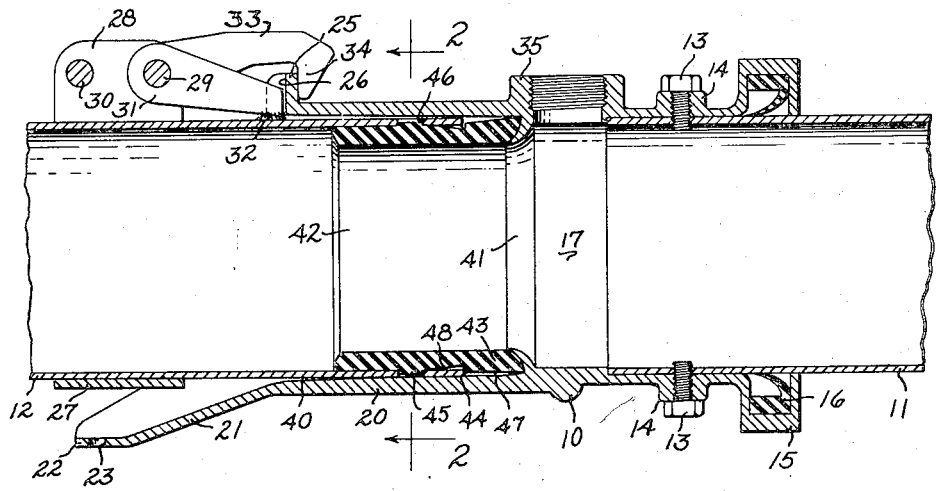
Fig. 1 is a vertical longitudinal section through a coupler of the present invention having the ends of a pair of tubes associated therewith.
Figure 2:
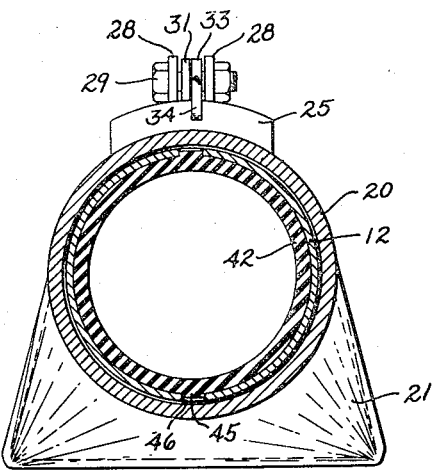
Fig. 2 is a vertical section taken substantially in the plane of line 2—2 of Fig. 1.

Figs. 1 and 2 disclose a coupler 10 having the ends of a pair of tubes 11 and 12 associated therewith. The ends 11 and 12 could represent the ends of lengths of rigid metal tubing or the ends of metallic nozzles fastened to lengths of flexible hose or the like. The end 11 is permanently affixed in one end of the coupler 10 as by means of threaded studs 13 passing through threaded bosses 14 in the coupler and aligned holes in the tube. The outer end of this portion of the coupler is preferably provided with a hollow annular flange 15 in which a sealing gasket 16 of well known type is arranged. Preferably the coupler 10 is provided with an annular central portion 17 of proper dimensions to provide a shoulder equal in depth to the thickness of the tube wall so as to minimize frictional resistance to fluid flow. It is to be appreciated that the portion of the coupler heretofore described forms no part of the present invention, and the section 11 could be provided with an integral coupler-forming end portion, or a coupler could otherwise be attached to the section 11 without departing from my present invention.

The opposite end of the coupler comprises an end bell 20 having a scoop 21 formed as an extension of the lower portion thereof, the end of the scoop being flattened and directed forwardly to provide a foot 22 having openings 23 therein for the reception of screws by means of which the foot may be attached to a baseplate or other foundation. The scoop provides means to support the coupler and prevent rotation thereof in usage and also provides a directing portion to direct the section 12 into the end bell 20 without interference from grass or twigs and without permitting the section 12 to pick up dirt or other foreign objects. The upper portion of the lip of the end bell 20 is provided with a latch flange 25, the forward surface of which is provided with a notch 26. A split ring 27 surrounds the section 12 and is provided with upwardly extending ears 28 for reception of a pair of bolts 29 and 30 which hold the ring 27 about the section 12. An arm 31 is pivotally mounted upon the bolt 29 between the ears 28 and extends forwardly toward the surface of the section 12, the tip thereof being welded to the section 12 at 32, thus providing a tongue receivable in the notch 26 and providing means firmly to retain the ring 27 at a specified distance from the end of the section 12. A latch lever 33 is also pivoted upon the bolt 29 between the ears 28 and is provided with a hook 34 at the free end thereof, the lever being of such length that the hook may be engaged behind the flange 25 when the tip of the arm 31 is fully engaged in the notch 26. The section 12 is detachably and non-rotatably latched in the end bell 20 by the members 31 and 34. The construction of the latching means and the end bell as described to this point is well known in the art and forms no part of my present invention, since other latching means and other shapes of end bells may be substituted without departing from the invention. The central section of the coupler may be provided with an internally threaded boss 35 by means of which lateral or vertical branches, or risers having sprinkler heads, or the like, may be attached to the coupler. This also forms no part of the present invention.

The improvement comprising the present invention is as follows:

The end bell 20 is provided with an interior wall 40 tapering inwardly from the outer edge of the end bell toward its inner extremity whereby the tube is easily inserted or withdrawn. The inner extremity of the end bell is defined by an annular internal flange 41 at the forward edge of the section 17, the flange being curved forwardly toward the open end of the bell and overhanging the inner surface 40 to define an annular groove for reception of the gasket as will appear. The walls of the flange 41 preferably converge to form a relatively thin edge so that the fluid flow will not be turbulent as the fluid passes the flange. A flexible annular gasket 42, made of impervious material such as natural or artificial rubber, is mounted within the end of the section 12, the gasket having an end portion 43 extending beyond the end of the section 12, the portion 43 terminating at its outer end in a rounded lip adapted to be seated snugly within the groove formed by the flange 41, and terminating at its other end in a circumferential shoulder 44 adapted to engage the end of the section 12 and limit inward movement of the gasket. The co-operating rounded surfaces of the flange 41 and portion 43 wedge the tip of the gasket into the groove formed by the flange 41 when the gasket is fully inserted. The portion of the gasket received within the section 12 is preferably provided with a plurality of outwardly extending lugs 45 adapted to be received within openings 46 in the wall of the section 12 further to hold the gasket against displacement. The portion of the gasket furthest inserted into the section 12 may be cemented to the inner surface of the section 12 as a further precaution. It will be noted that the portion of the gasket lying between the lugs 45 and the lip of the section 43 is recessed in its outer surface. Normally the interior of the gasket presents a regular cylindrical surface so that the outer surface 47 of the portion 43 is angularly disposed with respect to the inner surface of the end bell and similarly the surface 48 of the portion between the shoulder 44 and the lugs 45 is spaced from the inner surface of the section 12, such separation being accomplished by having the surface 47 taper inwardly from the edge of the portion 43 to the outer diameter of the shoulder 44 and the surface 48 taper outwardly from the inner diameter of the shoulder 44 toward the lugs 45. As seen in Fig. 1, pressure has been relieved from the conduit so the gasket has assumed its normal position. When pressure is internally applied the central portion of the gasket will bulge outwardly firmly to seat the surface 47 against the end bell and the surface 48 against the tube, with the shoulder 44 forced against the end of the tube section.

Figure 3:
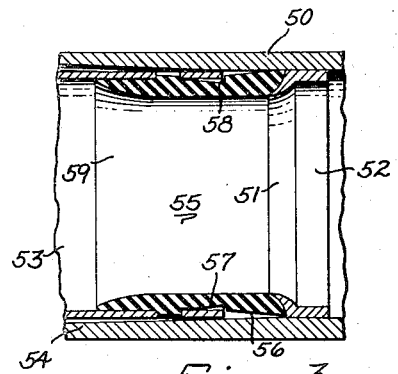
Fig. 3 is a vertical longitudinal section through a portion of a modified form of coupler having a slightly modified form of gasket associated therewith.

In Fig. 3 a modified arrangement is set forth wherein a coupler 50 is provided with an internal, forwardly directed, tapering flange 51 provided as a portion of a ring 52 which is slid into the coupler and fixed in position by any suitable means. The tube section 53 is slid into the tapered end bell 54 of the coupler and supports a flexible gasket 55 having a tapered surface 56 for engagement with the inner surface of the end bell 54 and a tapered surface 57 for engagement with the inner surface of the tube, the tapered sections being divided by a shoulder 58 as previously described. The sole difference between the gasket previously illustrated and described and the present gasket is that the exit end 59 of the gasket flares outwardly to a thin edge for decreasing flow resistance.

Figure 4:
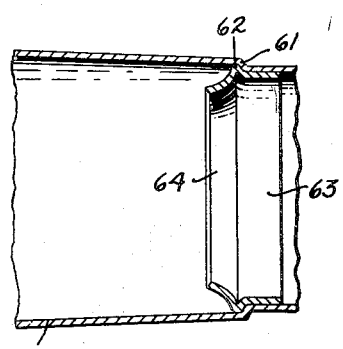
Fig. 4 is a vertical longitudinal section through a portion of a further modified form of coupler.

Fig. 4 illustrates a modified coupler comprising a tapered end bell section 60 which comprises an enlargement in a section of thin-walled tubing, the same being formed by a die or by spinning as is well known in the metal-forming art. The tapered section terminates in a shoulder 61 against which is seated a flange 62 formed in the center of a ring 63, the forward edge of the ring being shaped to provide an overhanging flange 64 as previously described. A gasket as previously described is receivable in the groove provided by the flange 64. The ring 63 may be retained by soldering or welding, or by press fit engagement with the reduced portion of the coupler, or other suitable means.

In each modification a gasket mounted in the end of a tube section may be moved into the tapering end bell with a minimum amount of frictional engagement with the walls thereof. The only portion of the gasket which normally projects to or beyond the circumference of the tube is an extreme tip portion at the end of the gasket. The tapered face to the rear of the tip is never dragged in engagement with the end bell wall. The curved surface of the overhanging flange engaging the curved surface of the outer portion of the gasket snugly forces the tip of the gasket against the end bell wall and provides means to direct the fluid through the annular gasket without any tendency to lift the tip of the gasket. When pressure is applied to the gasket by the fluid flowing through the conduit the intermediate portion of the gasket is bulged outwardly until the tapered surfaces are forced against the adjacent end bell and tube walls. A large surface area is subjected to sealing pressure and effectively prevents any leakage past the gasket. When pressure is relieved the tapered surface of the end portion is withdrawn from the end bell so that the tube may be withdrawn without damaging the gasket.

Having illustrated and described preferred arrangements of the present invention, it should be readily appreciated by those skilled in the art that modifications in arrangement and detail thereof may be achieved. All such modifications as come within the true spirit and scope of the appended claims are considered to be a part of my invention.

I claim:

1. A tube coupling comprising a tubular coupler, at least one end of said coupler comprising an end bell into which a tube end may be inserted, an annular, internal flange in said coupler defining the inner limit of said end bell, and an annular gasket adapted to be mounted within the tube end to be inserted in said end bell, said gasket having an annular portion extending beyond the end of the tube and engageable with said flange.

2. A tube coupling comprising a tubular coupler, at least one end of said coupler comprising an inwardly tapering end bell into which a tube end may be inserted, an annular, internal flange in said coupler defining the inner limit of said end bell, and an annular gasket adapted to be mounted within the tube end to be inserted in said said end bell, said gasket having an annular end portion extending beyond the end of the tube and engageable with said flange, said flange being curved forwardly toward the open end of said end bell and overhanging the inner surface thereof to define an annular groove into which said annular end portion may be wedged.

3. A tube coupling comprising a tubular coupler, at least one end of said coupler comprising an end bell into which a tube end may be inserted, an annular, internal flange in said coupler defining the inner limit of said end bell, and an annular gasket adapted to be mounted within the tube end to be inserted in said end bell, said gasket having an annular end portion extending beyond the end of the tube and engageable with said flange to limit inward movement of said tube, said annular end portion being tapered rearwardly from the forward edge thereof whereby minimum resistance to insertion of said tube end is provided.

4. A tube coupling comprising a tubular coupler, at least one end of said coupler comprising an inwardly tapering end bell into which a tube end may be inserted, an annular, internal flange in said coupler defining the inner limit of said end bell, and an annular gasket adapted to be mounted within the tube end to be inserted in said end bell, said gasket having an annular end portion extending beyond the end of the tube and engageable with said flange to limit inward movement of said tube, said flange being curved forwardly toward the open end of said end bell and overhanging the inner surface thereof to define an annular groove into which said annular end portion may be wedged, said annular end portion being tapered rearwardly from the forward edge thereof whereby minimum resistance to insertion of said tube end is provided.

5. A tube coupling comprising a tubular coupler, at least one end of said coupler comprising an end bell into which a tube end may be inserted, an annular, internal flange in said coupler defining the inner limit of said end bell, and an annular gasket adapted to be mounted within the tube end to be inserted in said end bell, said gasket having an annular portion extending beyond the end of the tube and engageable with said flange to limit inward movement of said tube, said flange being curved forwardly toward the open end of said end bell and overhanging the inner surface thereof to define an annular groove into which said annular end portion may be wedged, said annular end portion being tapered rearwardly from the forward edge thereof whereby minimum resistance to insertion of said tube end is provided, and said gasket having an exterior annular recess adjacent the inner surface of the end of said tube of sufficient depth to permit expansion of the central portion of said gasket when subjected to internal fluid pressure whereby the outer tapered surface of said annular end portion may be expanded into firm engagement with the adjacent inner surface of said end bell.

JAMES A. MONTGOMERY.

REFERENCES CITED

The following references are of record in the file of this patent:

UNITED STATES PATENTS

| Number | Name | Date |
|---|---|---|
| 1,945,293 | Pierce | Jan. 30, 1934 |